A. J. BONNA.
STEEL PIPE WITH A DOUBLE ARMORED CONCRETE COATING.
APPLICATION FILED NOV. 15, 1905.
921,354.
Patented May 11, 1909.
2 SHEETS—SHEET 1.
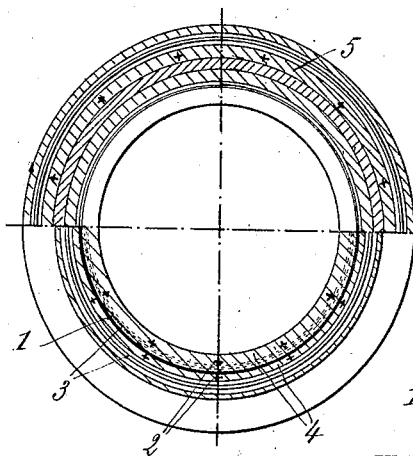
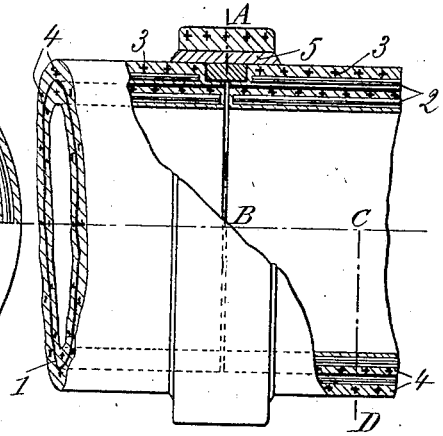
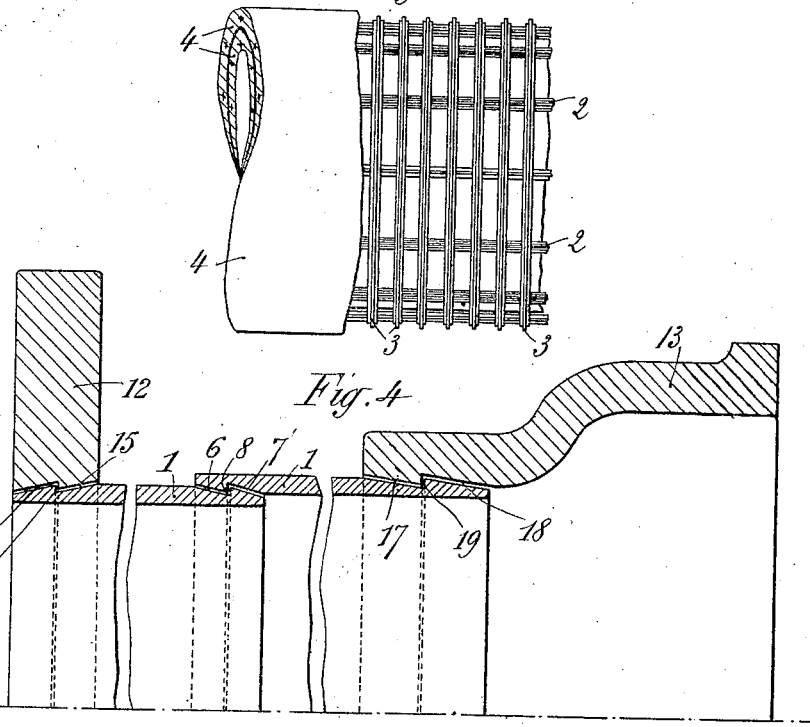
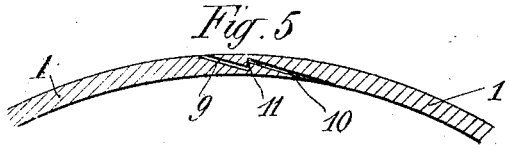

A. J. BONNA.
STEEL PIPE WITH A DOUBLE ARMORED CONCRETE COATING.
APPLICATION FILED NOV. 15, 1905.
921,354. Patented May 11, 1909.
2 SHEETS—SHEET 2.
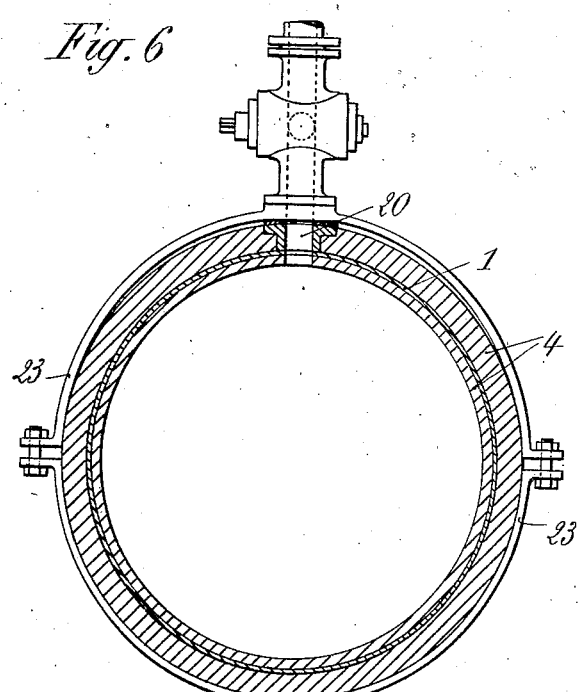
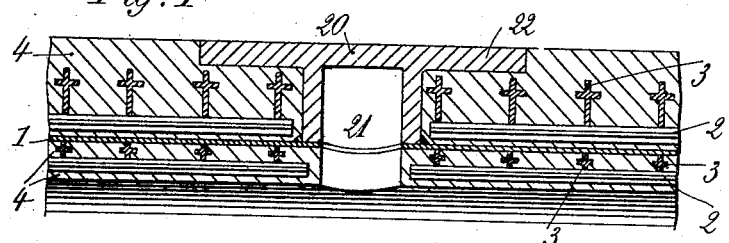
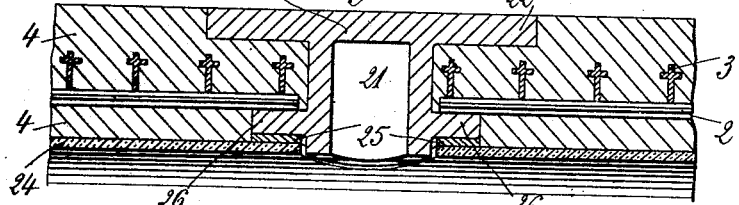
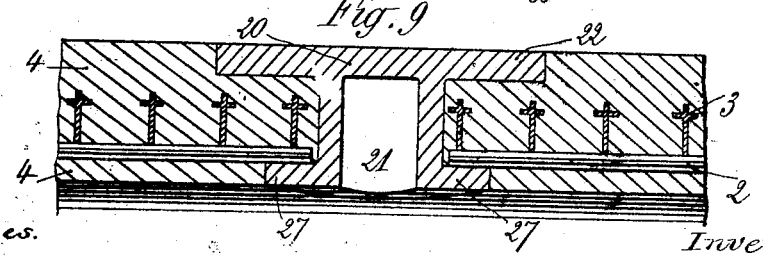
Witnesses.
Inventor.
Aimé Joseph Bonna,
by _____ atty.

UNITED STATES PATENT OFFICE.

AIME JOSEPH BONNA, OF PARIS, FRANCE.

STEEL PIPE WITH A DOUBLE-ARMORED CONCRETE COATING.

No. 921,354.                Specification of Letters Patent.         Patented May 11, 1909.

Application filed November 15, 1905. Serial No. 287,547.

*To all whom it may concern:*

Be it known that I, AIME JOSEPH BONNA, citizen of the Republic of France, resident of 78 Rue d'Anjou, Paris, France, contractor, have invented certain new and useful Improvements in Steel Pipes with a Double-Armored Cement Coating; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to improvements in pipes made of armored cement or other analogous material, such for example as asbestos-cement (fibers of asbestos agglomerated by means of cement), itself strengthened by a metallic armature and it consists in embedding in, the thickness of these pipes a steel tube, preferably of soft steel, formed of a sheet, the edges of which are soldered autogenously after having been clipped in a special manner which avoids all slip or detachment during the soldering.

It consists, further in the employment, as an armature of the cement or other analogous material forming the exterior coating and the interior coating of the metallic tube, of steel bars of a transverse section in the form of a cross with the object of increasing the binding of the cement and the rigidity of the envelop.

It consists, finally, in placing, in certain positions in conduits of this kind, a special arrangement which permits of the ready piercing of a hole for making a branch connection, even when the conduits are under pressure, it avoiding the necessity of cutting the armature, which is always a very difficult operation.

Pipes constructed in accordance with the present improvements combine the advantages of soldered steel pipes (very great elasticity, resistance, lightness, imperviousness) with those of armored coverings of cement or other analogous material (rigidity, incorrodibility, insuring indefinite durability). Owing to the particular means of fastening which is employed for making the pipe, use may be made of hammered and rolled steel consequently imparting to the pipe great tenacity, great elasticity, considerable resistance, and the edges may be united without riveting or any other method of connection than the autogenous soldering. The facility with which also a conduit may be tapped by means of the above said special arrangement employed for this purpose, presents moreover a great advantage.

In the case of pipes for conducting gas, the interior coating of the steel tube may be made of armored pitch or tar.

The invention is specially advantageous for conduits of large diameter serving for the supply of water, gas, etc., to towns, as also for the industrial utilization of water-falls, which conduits have to resist considerable interior pressures and often must be of great rigidity.

In the drawings, Figure 1 illustrates a pipe with the improvements applied thereto taken respectively on the lines A, B, and C, D, of Fig. 2. Fig. 2 is a longitudinal section thereof. Fig. 3 is an elevation of same, the armature being left exposed upon a portion of such figure. Figs. 4 and 5 are a longitudinal section and a transverse section illustrating the clipping of the sheets which form the steel tube. Fig. 6 is a transverse section of a pipe illustrating the arrangement which permits of a hole being pierced while under pressure, and also shows the collar for the connection. Figs. 7, 8 and 9 are longitudinal sections illustrating the application of the same arrangement respectively to a pipe fitted with a steel tube and a double armored cement coating, to a pipe of armored cement with an interior tube of glass, and to a pipe of armored cement without tube, this arrangement being capable of employment with the same advantage whether there is or is not a steel tube within the pipe.

In all these figures, 1 indicates the sheet steel tube; 2 the longitudinal armature bars; and 3 the transversal, both of same being of cruciform section. 4 indicates the cement, the asbestos-cement or other analogous material. 5 is a connection ring of armored cement.

6, 7 (Fig. 4) are the two circular chamfers formed at the extremities of the steel tubes with an intermediate shoulder 8, with the object of clipping the two extremities one to the other before soldering same, whenever the thickness of the sheet metal is sufficient to permit of this. Chamfers 9, 10, and a shoulder 11, Fig. 5, are similarly formed on the longitudinal edges of the sheet metal. When the two parts to be connected have been brought to fit one into the other, they are clipped or hooked together by shoulders 8 or 11, in such a way that during the act of soldering them by the autogenous soldering, there is no need to fear any slip occurring. As will be seen by Fig. 4 the same process may be employed for fixing on a straight sheet metal pipe a flange 12 or sleeve 13, the abutting surface of the part 12 or 13 being then chamfered on its inner edge in the same manner as the extremity of the pipe, as will be seen at 14, 15, 16, and 17, 18, 19.

20 (Figs. 6, 7, 8, 9) is the part which permits of the ready effecting of connections to pipes under pressure. Fig. 6 also shows a connecting clamping pressure collar 23. The part 20 is inserted in the exterior envelop of armored cement being maintained by the metallic armature 23, and fixed by soldering to the steel tube 1 (Fig. 7). Its height is equal to the thickness of the exterior envelop of armored cement; it may for example be of cast steel or iron and comprises a tubular part 21 and an upper oval cover 22. It can be pierced without encountering any armature whatever so that it permits of connection under pressure, as in cast iron pipes. For pipes with inner glass tubes 24 (Fig. 8), the connection 20 is embedded in the envelop of cement and supported by the armature, by means of the flange 26 with which it is provided, then connected to the glass tube by a plastic joint 25 of india rubber and pitch. When there is no tube within the pipe (Fig. 9) the part 20 is embedded in the cement envelop, and supported by the armature through the flange 27.

What I claim as my invention, and desire to secure by Letters Patent, is:—

An armored pipe composed of a plurality of metal sheets formed into tubes, said sheets having chamfered edges formed by off-set parallel beveled faces extending longitudinally of the sheet whereby said edges are interlocked when brought together, an externally and peripherally chamfered end, an internally and peripherally chamfered end, said chamfered ends formed by off-set beveled end faces, whereby consecutive pipe lengths are interlocked and prevented from accidental longitudinal displacement, longitudinal and peripheral armor embedded in cement surrounding the tube and having an hiatus in the armor, a branch pipe connecting member having an outer and an inner flange extending over ends of the armor, one of said flanges flush with the outer surface of the pipe, and a chamber in said connection communicating with the interior of the tube.

In testimony that I claim the foregoing as my invention, I have signed my name in presence of subscribing witnesses.

AIME JOSEPH BONNA.

Witnesses:
FREDERIC W. CAULDWELL,
T. N. CAULDWELL,
ALCIDE FABE.